US010628487B2

(12) United States Patent
Choi et al.

(10) Patent No.: US 10,628,487 B2
(45) Date of Patent: Apr. 21, 2020

(54) METHOD FOR HASH COLLISION DETECTION BASED ON THE SORTING UNIT OF THE BUCKET

(71) Applicants: Industry Academic Cooperation Foundation of Yeungnam University, Gyeongsan-si, Gyeongsangbuk-do (KR); INDUSTRY-ACADEMIC COOPERATION FOUNDATION, KUNSAN NATIONAL UNIVERSITY, Gunsan-si, Jeollabuk-do (KR)

(72) Inventors: Gyu Sang Choi, Daegu (KR); Byung Won On, Gunsan-si (KR); In Gyu Lee, Incheon (KR)

(73) Assignees: INDUSTRY ACADEMIC COOPERATION FOUNDATION OF YEUNGNAM UNIVERSITY, Gyeongsan-si, Gyeongsangbuk-Do (KR); INDUSTRY-ACADEMIC COOPERATION FOUNDATION, KUNSAN NATIONAL UNIVERSITY, Gunsan-si, Jeollabuk-Do (KR)

(*) Notice: Subject to any disclaimer, the term of this patent is extended or adjusted under 35 U.S.C. 154(b) by 619 days.

(21) Appl. No.: 15/348,871

(22) Filed: Nov. 10, 2016

(65) Prior Publication Data

US 2017/0161397 A1 Jun. 8, 2017

(30) Foreign Application Priority Data

Dec. 3, 2015 (KR) .......................... 10-2015-0171727

(51) Int. Cl.
*G06F 7/00* (2006.01)
*G06F 16/901* (2019.01)

(52) U.S. Cl.
CPC ................................ *G06F 16/9014* (2019.01)

(58) Field of Classification Search
CPC ............. G06F 16/9014; G06F 16/137; G06F 12/0238; G06F 12/1748; G06F 12/1018;
(Continued)

(56) References Cited

U.S. PATENT DOCUMENTS 5,893,086 A * 4/1999 Schmuck ............ G06F 11/1435
6,052,697 A * 4/2000 Bennett ............... G06F 12/0864
(Continued)

FOREIGN PATENT DOCUMENTS

JP 2015515047 A 5/2015
KR 20110038246 A 4/2011

OTHER PUBLICATIONS

Korean Office Action dated Sep. 13, 2016, Korean Application No. 10-2015-0171727.

*Primary Examiner* — Azam M Cheema
(74) *Attorney, Agent, or Firm* — Womble Bond Dickinson (US) LLP

(57) ABSTRACT

The present disclosure relates to a method for hash collision detection based on the sorting unit of the bucket designed to reduce the future search time by pre-aligning the database in the bucket and to enhance the efficiency in a search within the database. The present disclosure, a method for hash collision detection based on the sorting unit of the bucket using conventional separate chaining method, comprises aligning records in a single bucket of a directory in ascending order or descending order and maintaining the alignment of records in the bucket when new records are added to the directory.

1 Claim, 7 Drawing Sheets

(58) Field of Classification Search
CPC ............... G06F 16/2453; G06F 16/285; G06F 17/30949; G06F 17/30; G06F 17/21; G06F 40/14; G06F 40/242; H03M 7/3088; H03M 7/3084
See application file for complete search history.

(56) References Cited

U.S. PATENT DOCUMENTS

| | | | |
|---|---|---|---|
| 6,530,008 B1 * | 3/2003 | Lin | G06F 16/21 711/171 |
| 2007/0118578 A1 * | 5/2007 | Ahrens | G06F 16/137 |
| 2012/0323970 A1 * | 12/2012 | Larson | G06F 16/9014 707/800 |
| 2013/0227195 A1 | 8/2013 | Beaverson et al. | |

* cited by examiner

| Insert(The Number of Added Records) x Retrieve(The Number of Searching Operation) | Separate Chaining | | | Buket Sorting Hash | | |
|---|---|---|---|---|---|---|
| | Insertion | Retrieve | Total | Insertion | Retrieve | Total |
| 100*1000 | 29.024573 | 221.3175 | 250.34208 | 25.945587 | 130.83637 | 156.78196 |
| 200*2000 | 55.298586 | 872.7488 | 928.04739 | 70.406143 | 329.16411 | 399.57026 |
| 300*3000 | 108.46241 | 1488.2586 | 1596.721 | 66.793466 | 485.20712 | 552.00058 |
| 400*4000 | 149.63871 | 2599.1567 | 2748.7954 | 86.581082 | 669.28942 | 755.8705 |
| 500*5000 | 150.7882 | 3995.3741 | 4146.1623 | 121.84573 | 917.57883 | 1039.4246 |
| 600*6000 | 171.47898 | 5524.7269 | 5696.2059 | 124.39103 | 1074.2376 | 1198.6287 |
| 700*7000 | 195.16665 | 7334.4316 | 7529.5983 | 146.64183 | 1319.7354 | 1466.3773 |
| 800*8000 | 200.62672 | 9950.3791 | 10151.006 | 213.02477 | 1622.995 | 1836.0198 |
| 900*9000 | 230.67762 | 12285.687 | 12516.365 | 210.76684 | 1877.114 | 2087.8808 |
| 1000*10000 | 245.99044 | 15336.88 | 15582.87 | 251.49156 | 2150.8974 | 2402.389 |

METHOD FOR HASH COLLISION DETECTION BASED ON THE SORTING UNIT OF THE BUCKET

CROSS-REFERENCE TO RELATED APPLICATIONS

This application claims the benefit under 35 USC 119(a) of Korean Patent Application No. 10-2015-0171727 filed on Dec. 3, 2015 in the Korean Intellectual Property Office, the entire disclosure of which is incorporated herein by reference for all purposes.

BACKGROUND

1. Field

The present disclosure relates to a method for hash collision detection based on the sorting unit of the bucket, and more particularly, to a method for hash collision detection based on the sorting unit of the bucket designed to reduce the future search time by pre-aligning the database in the bucket and to enhance the efficiency in a search within the database.

2. Description of Related Art

As is well known, the index data structure enables a speedy search of targeted data through records. The most fundamental index data structure is a method of aligning all the records in sequential order. As an index is generally smaller than a data file, searching an index is more efficient than searching the entire data in sequential order. However, most database and file systems often use hash and tree index data structure to manage a large amount of data since the extent to be searched in order to detect the targeted records becomes wider as the number of records increases.

The tree structure method is not efficient in a big dataset since it takes long to search data due to the method's susceptibility to the number, the format, and the location of records saved in files and the difference between the best way and the worst way can be great.

Hash is a method of searching records by using the numerical characteristic of the key, namely by calculation and not by comparison. Hash is now being used in various fields of the computer as it can use enough memory space, its speed can be predetermined, and it is easy to be inserted and be removed.

The separate chaining method takes each bucket of the hash table as a Head node, composes the index portion, which functions as a link between the saving unit of the record key and the node, with a single bucket, and makes a single connection list per a bucket of the Head node. Each bucket is independently situated in the saving apparatus.

The method to read all the slots by linking them in a link list whenever a collision happens to save only the needed data in a saving apparatus is suitable for the environment such as RAM (Random Access Memory) where a random approach is possible and an approach is very speedy. The same method is hard to be directly applied to NAND flash memory as the reading speed of the NAND flash memory is faster than those of a hard disk and other NAND flash memories but it is slower than the speed of RAM. And that a minimum reading unit of the NAND flash memory is Page, different from a Bit unit of the RAM, is one of the problems of the separate chaining method. It causes much damage to continuously read and write the Page unit to read a small record.

Although the most ideal hash table is composed of buckets and slots suitable for the number of records, there is a difficulty in determining the size of a bucket due to the characteristic of the index data structure wherein the ideal records are continuously transformed by being inserted and removed.

Making the size of the bucket identical to the size of the NAND flash memory is a way to demonstrate the best result in efficiency considering the change of records numbers. However, the method has a disadvantage in that it needs much more saving space than needed in a hash table where collisions do not frequently occur.

Although the best hash function is the status where collisions rarely occur and distribution is well aligned, the efficiency of the entire hash table may be decreased as the resource waste becomes serious and the Hit Rate of the memory buffer is reduced in case when the size of the bucket used in the separate chaining method is set to the Page unit of the flash memory, the unit of which is much larger compared to the sector unit of the conventional hard disk. In case of hash wherein collisions often occur, it is more efficient to reduce collision by Rehashing which use other hash functions.

SUMMARY

The present disclosure is directed to providing a method for hash collision detection based on the sorting unit of the bucket which improves the efficiency of the hash table by connecting the new bucket assigned to save the new records to the pre-aligned bucket and thus preventing additional alignment.

A method for hash collision detection based on the sorting unit of the bucket using conventional separate chaining method may include aligning records in a single bucket of a directory in ascending order or descending order; and maintaining the alignment of records in the bucket when new records are added to the directory.

The alignment is not maintained between records saved in the buckets, and the alignment between records in a single bucket is maintained.

In adding new records to the directory, when no empty space exists in the bucket, the steps are: being assigned a new bucket first in order to save new records, connecting it to the previously existing bucket, and saving the new records into the newly assigned bucket When the number of the newly added records is smaller than the number of the previously existing records, the steps are: moving the previously existing records to a next space and saving the new records in the space where the previously existing records used to be saved.

According to an exemplary embodiment of the method for hash collision detection based on the sorting unit of the bucket, a new bucket is assigned to save it when a new record is added, and the new bucket improves the efficiency of hash table by being connected to the previously existing bucket and preventing an additional alignment.

Particularly, using a combination chaining between records and a bucket separation method for the combination chain of the present disclosure is effective in a smaller storage space application, in a swift insertion, and in a swift search compared to separate chaining method.

DETAILED DESCRIPTION

The present invention will be described more fully hereinafter with reference to the accompanying drawings, in which exemplary embodiments of the invention are shown. Also, in describing the present disclosure, when a concrete explanation on related technology might render the gist of the present disclosure unclear, the concrete explanation is omitted.

According to a general separate chaining method, records in buckets should be compared one by one while visiting buckets linked in a single directory entry in sequential order when a particular record saved in hash is needed to be searched. Namely, it takes a long time to search. To overcome such disadvantage of the separate chaining method, the alignment between records in buckets is maintained in this disclosure. In other words, maintaining the alignment between records in buckets and not maintaining the alignment between buckets are desirable when new records are added. In this way, searching time can be drastically saved as a binary search is possible within buckets.

The present disclosure will be described more fully hereinafter with reference to the accompanying drawings, in which exemplary embodiments of the disclosure are shown.

Figure 1:
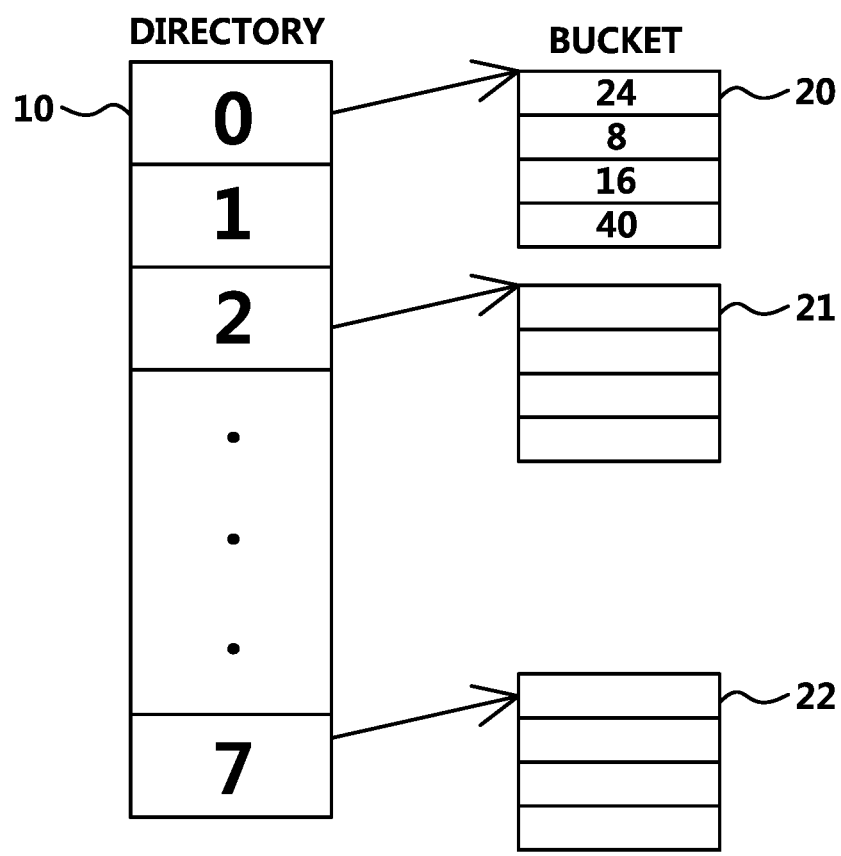
FIG. 1 is a block diagram illustrating a general separate chaining hash method.
Figure 2:
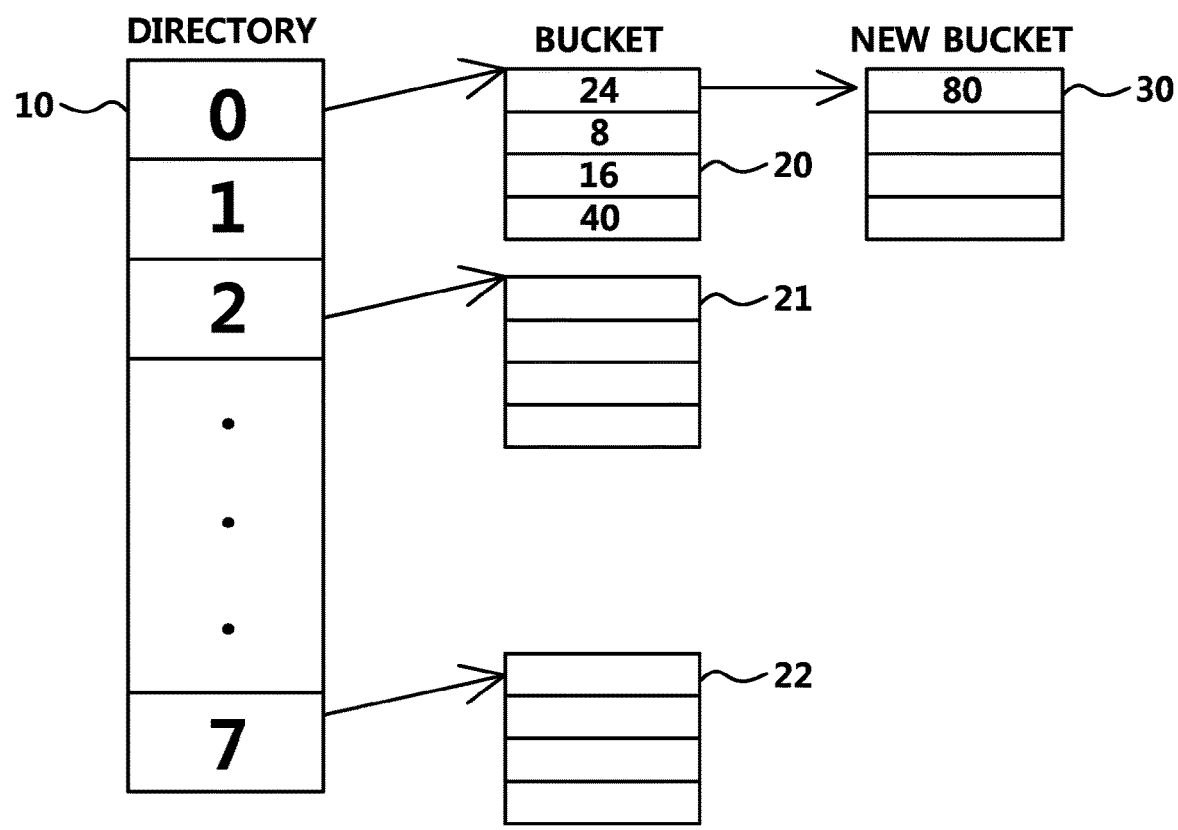
FIG. 2 is a block diagram illustrating an occasion of adding a new record 80 to FIG. 1.
Figure 3:
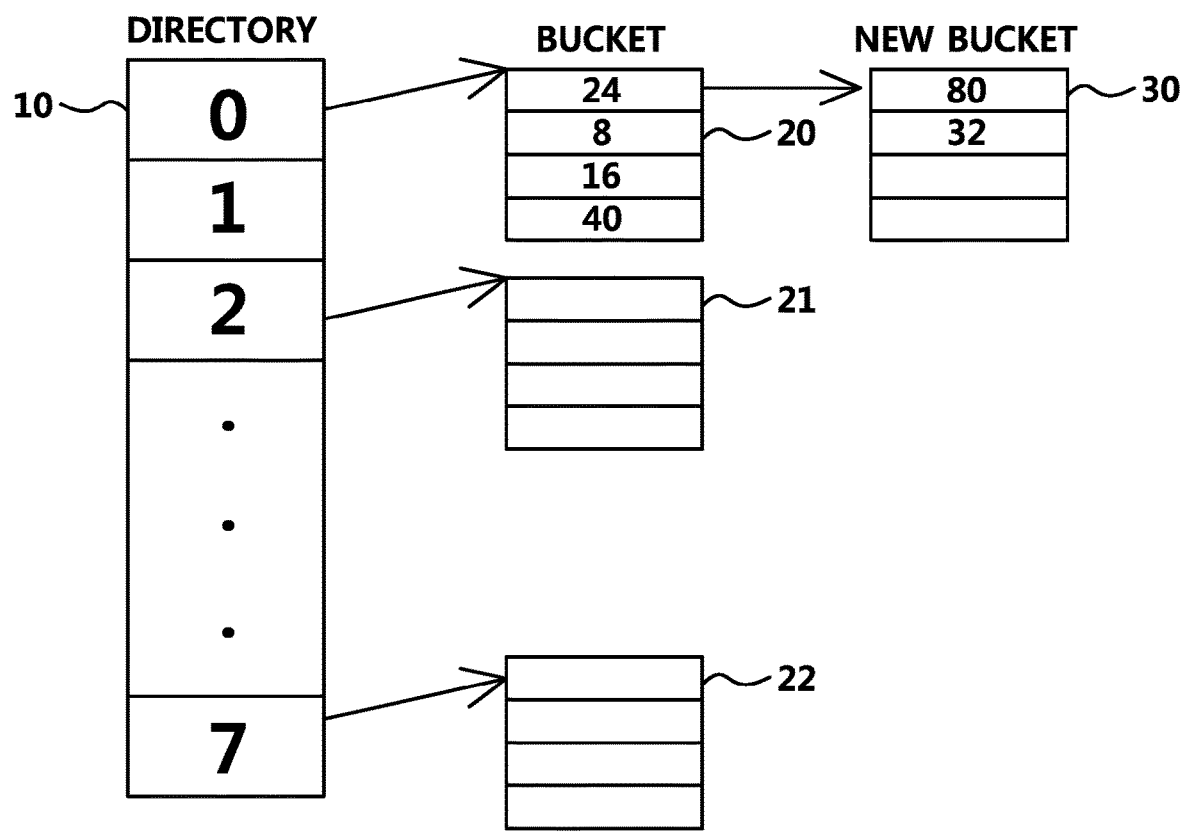
FIG. 3 is a block diagram illustrating an occasion of adding a new record 32 to FIG. 2.
Figure 4:
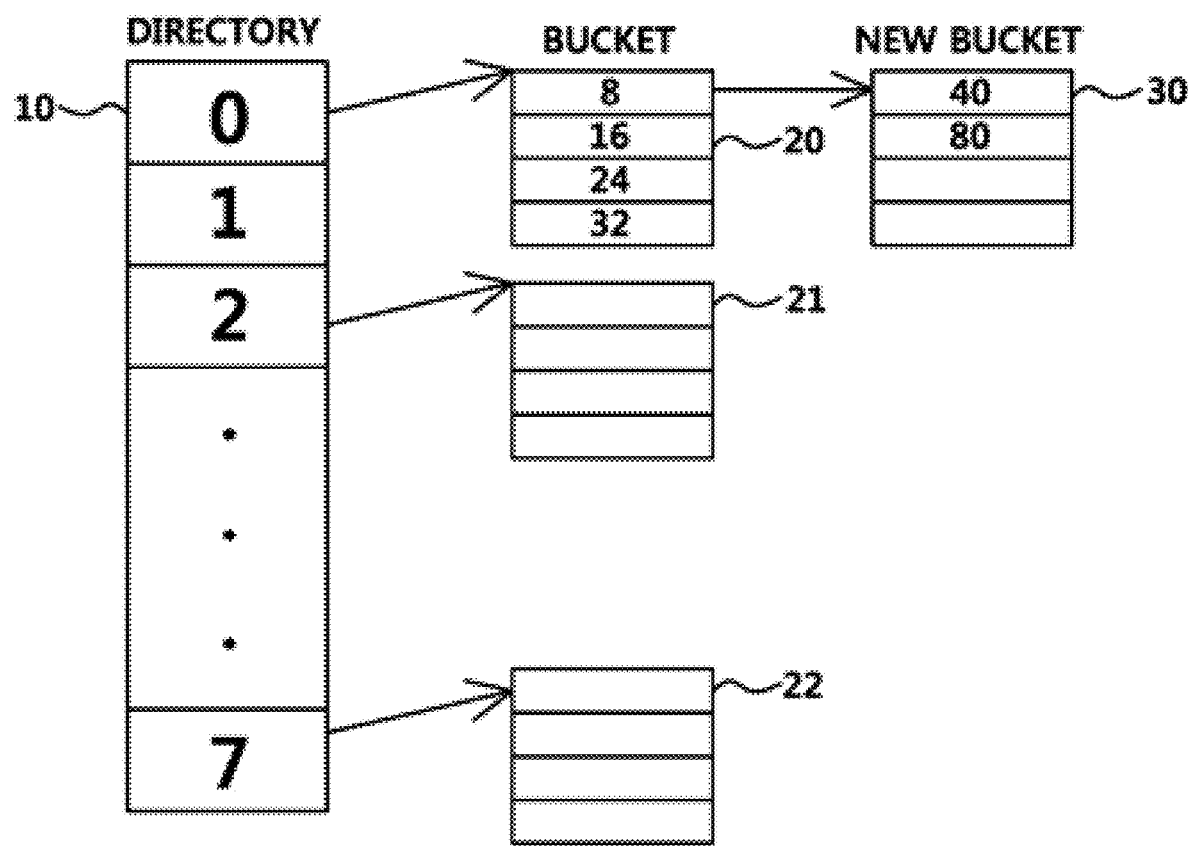
FIG. 4 is a block diagram illustrating an occasion of applying a method of aligning the entire record in a separate chaining.

FIG. 1 is a block diagram illustrating a general separate chaining hash method. FIG. 2 is a block diagram illustrating an occasion of adding a new record 80 to FIG. 1. FIG. 3 is a block diagram illustrating an occasion of adding a new record 32 to FIG. 2. FIG. 4 is a block diagram illustrating an occasion of applying a method of aligning the entire record in a separate chaining.

As illustrated in FIG. 1, the records, 24, 8, 16, 40 are sequentially added into directory 10 entry 0 when a general separate chaining method is applied. In the separate chaining, records in a single bucket 20 are not aligned but are saved in the bucket in a sequential order according to the order of the addition of records.

FIG. 2 illustrates an occasion of adding a new record 80 to FIG. 1, and as illustrated, as there is no empty space in bucket 20 linked to directory 10 entry 0 in FIG. 1, a new bucket 30 is needed to be assigned to save a new record 80 and is connected to the existing bucket 20. Next, a newly added record 80 is saved in a newly assigned bucket 30.

FIG. 3 illustrates an occasion of adding a new record 32 to FIG. 2, and as illustrated, as there is an empty space in bucket 30 where record 80 is saved, record 32 is saved after the pre-existing record 80. Namely, according to the conventional separation method, records are saved in bucket 30 following the order of their addition.

FIG. 4 is a block diagram illustrating an occasion of applying a method of aligning the whole record in a separate chaining, and as illustrated, records 8, 16, 24, 32 are saved in bucket 20 through the entire process of alignment and record 40 and 80 are saved in bucket 30 by sequential alignment.

Figure 5:
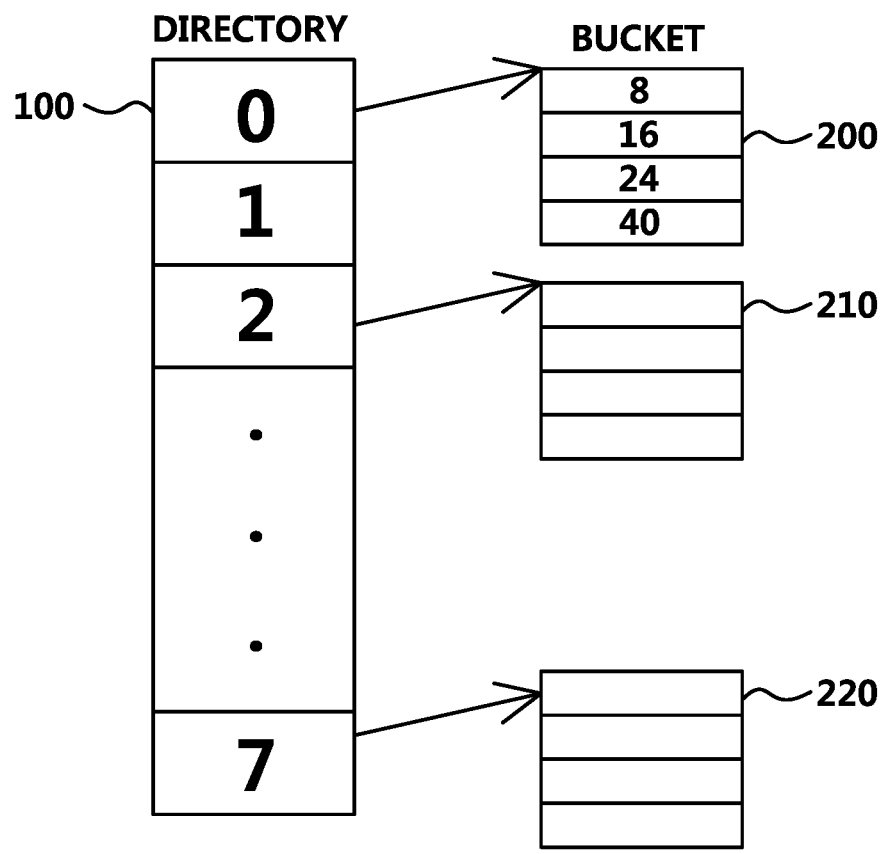
FIG. 5 is a block diagram illustrating a method for hash collision detection based on the sorting unit of the bucket according to an exemplary embodiment of the present disclosure.
Figure 6:
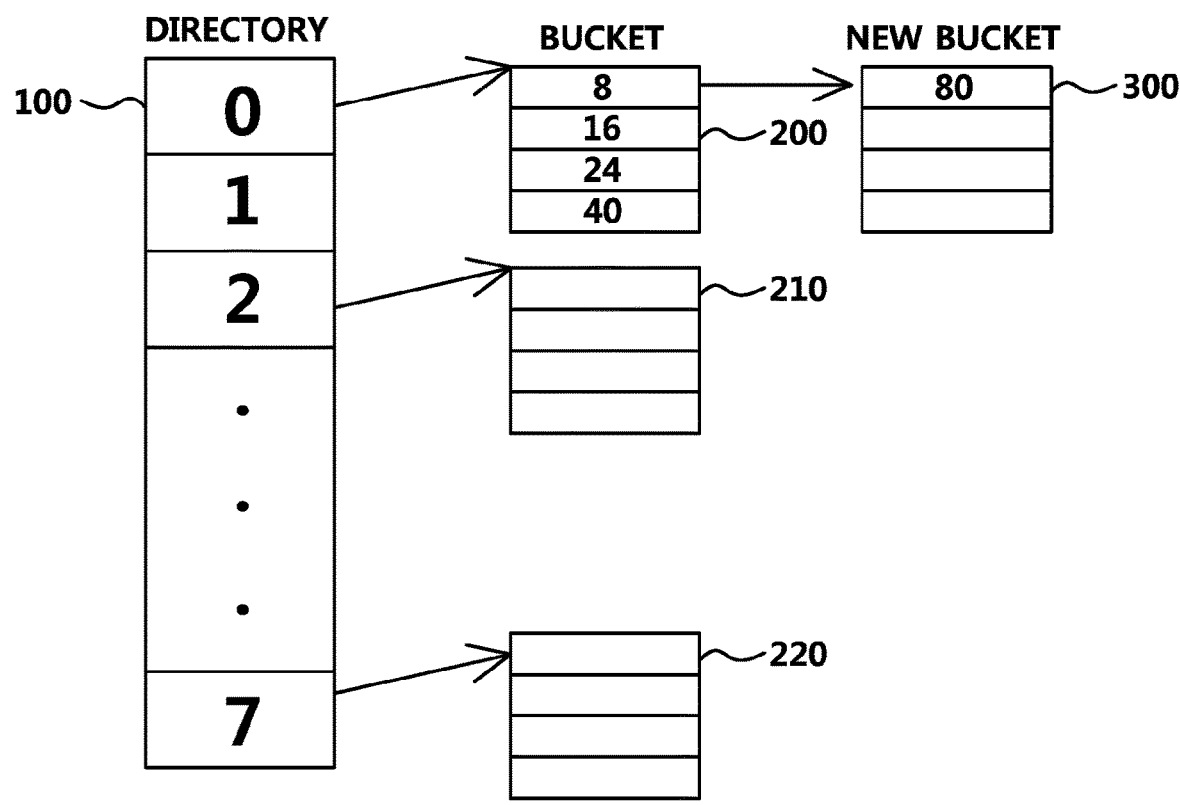
FIG. 6 is a block diagram illustrating an occasion of adding a new record 80 to FIG. 5.
Figures 7, 8:
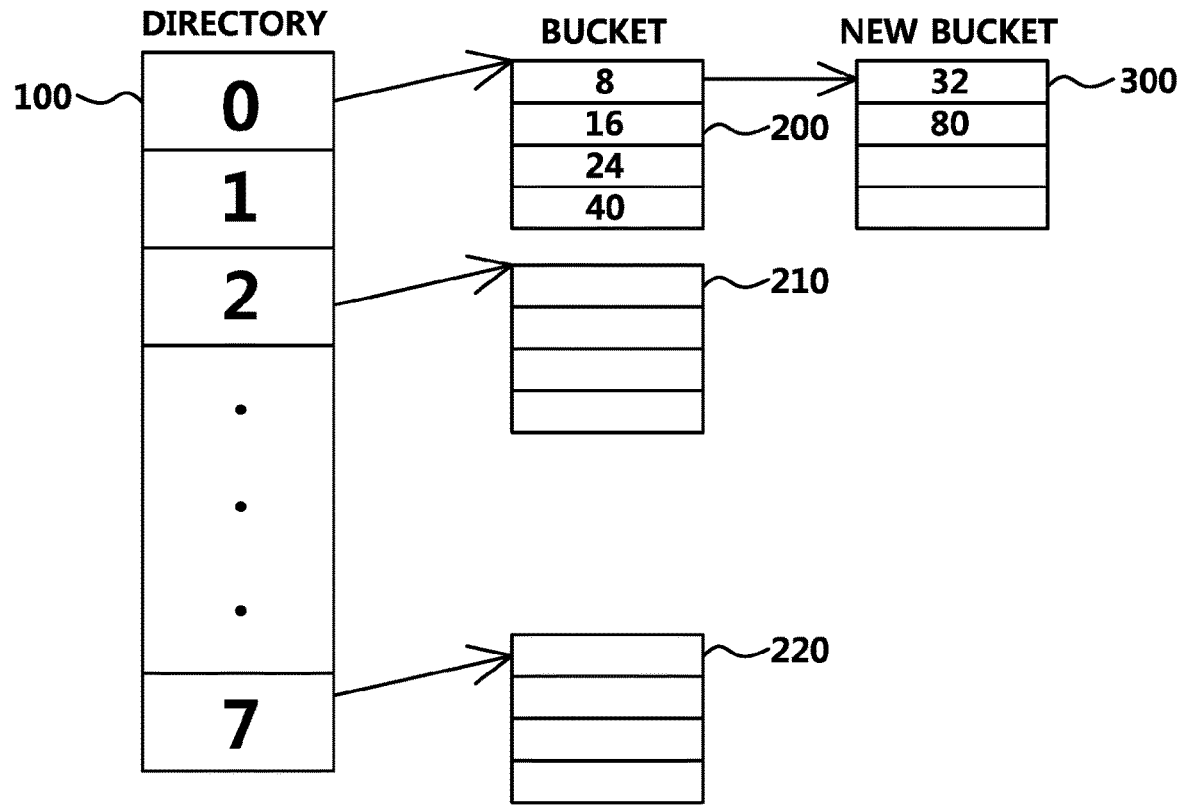
FIG. 7 is a block diagram illustrating an occasion of adding a new record 32 to FIG. 6.
FIG. 8 is a table illustrating the results of experiments with additional records.

In contrast, FIGS. 5 to 7 show examples of applying a bucket alignment chain method suggested by the present disclosure.

FIG. 5 is a block diagram illustrating a method for hash collision detection based on the sorting unit of the bucket according to an exemplary embodiment of the present disclosure, FIG. 6 is a block diagram illustrating an occasion of adding a new record 80 to FIG. 5, and FIG. 7 is a block diagram illustrating an occasion of adding a new record 32 to FIG. 6.

As illustrated in FIG. 5, the diagram shows that records 8, 16, 24, 40 are sequentially added to directory 100.

The present disclosure maintains the alignment when records are saved in bucket 200. Therefore, in fact, records which saved in bucket 200 are aligned by the sequence of 8, 16, 24, to 40.

FIG. 6 illustrates an occasion of adding a new record 80 to FIG. 5, and as illustrated, as there is no empty space in bucket 200 linked to directory 100 entry 0, a new bucket 300 is first assigned to save the new record 80 and is linked to the pre-existing bucket 200. Next, a newly added record 80 is saved in the newly assigned bucket 300.

The method of the present disclosure maintains the alignment between records in the bucket 200. Namely, the alignment does not occur in bucket 200.

FIG. 7 illustrates an occasion of adding a new record 32 to FIG. 6.

As the newly added record 32 is a smaller number than the pre-existing record 80, record 80 is moved to the lower space of bucket 300, and record 32 is saved in the location where record 80 used to be saved. At the moment, the present disclosure does not perform the entire alignment as illustrated in FIG. 4.

FIG. 8 is a table illustrating the results of experiments with additional records. As illustrated, 100 to 1,000 records were added in each experiment, and 1,000~10,000 searching operation for the added records were performed. At this time, 10 times of experiments for each were performed and experiments of efficiency were proceeded using their average value.

Therefore, according to an exemplary embodiment of the method for hash collision detection based on the sorting unit of the bucket, a new bucket is assigned to save it when a new record is added, and the new bucket improves the efficiency of hash table by being connected to the previously existing bucket and preventing an additional alignment, namely by maintaining the alignment between records within the bucket.

Particularly, when a combination chaining method between records and a bucket separate chaining method are used for the combination chaining method of the present disclosure, a use of smaller space, a speedy insertion, and a speedy search compared to a separate chaining method become possible.

Further, the present disclosure can be used for any applications including operating systems using the separate chaining hash method or database, and the present disclosure can improve the efficiency in hash processing.

While this invention has been described in connection with what is presently considered to be practical exemplary embodiments, it is to be understood that the invention is not limited to the disclosed embodiments, but, on the contrary, is intended to cover various modifications and equivalent alignments included within the spirit and scope of the appended claims.

What is claimed is:

1. A method for hash collision detection based on a bucket sorting, the method comprising:

aligning records in a first bucket of a directory in ascending order or descending order;

aligning a first new record in the first bucket of the directory between the records existed in ascending order or descending order when the first new record is added to the first bucket; and maintaining an alignment of records in a second bucket of the directory, wherein said maintaining the alignment does not align the records between the first bucket and the second bucket, wherein no empty space exists in the first bucket to add a second new record, newly assigning a third bucket in the directory; connecting the third bucket to the first bucket; and saving the second new record into the third bucket, when a third new record is added to the third bucket and the third new record is smaller than the second new record, moving the second new record to a next space in the third bucket; and saving the third new record in a space where the second new record used to be saved, when the third new record is greater than the second new record, saving the third new record in an empty space in order without moving the second record.

* * * * *